United States Patent [19]

Rousselle

[11] Patent Number: 5,447,025
[45] Date of Patent: Sep. 5, 1995

[54] COMBINED GAS TURBINE AND STEAM TURBINE POWER PLANT

[75] Inventor: Jean-Claude Rousselle, Saint Witz, France

[73] Assignee: GEC Alsthom Electromecanique SA, Paris, France

[21] Appl. No.: 199,576

[22] Filed: Feb. 22, 1994

[30] Foreign Application Priority Data

Mar. 3, 1993 [FR] France ............................ 93 02445

[51] Int. Cl.⁶ ............................ F02C 6/18; F02C 7/20
[52] U.S. Cl. .................... 60/39.182; 60/39.31; 415/213.1
[58] Field of Search .............. 60/39.182, 39.31; 415/213.1; 248/605, 606, 639

[56] References Cited

U.S. PATENT DOCUMENTS

| | | | |
|---|---|---|---|
| 2,443,054 | 6/1948 | Putz et al. | 60/39.31 |
| 4,204,804 | 5/1980 | Woodger | 415/213;1 |
| 4,961,310 | 10/1990 | Moore et al. | 60/39.182 |
| 5,326,222 | 7/1994 | Matyscak et al. | 415/213.1 |

Primary Examiner—Louis J. Casaregola
Attorney, Agent, or Firm—Sughrue, Mion, Zinn, Macpeak & Seas

[57] ABSTRACT

The power plant comprises a gas turbine module and a steam turbine having a high pressure portion with or without a medium pressure portion, and a low pressure portion mounted on a common shaft line driving an alternator disposed at the end of the line of shaft, the stator of the gas turbine being supported on a base integral with a foundation via supports having low stiffness in translation, and also being secured to the stationary portion of an abutment for the shaft line, wherein the shaft line is provided with an abutment whose stationary portion is mounted on the foundation and is disposed between the two fixing points on the foundation of the stators of the low pressure portion and of the high pressure portion, with or without a medium pressure portion. The invention is applicable to reducing expansion along the single shaft line, and to increasing efficiency.

4 Claims, 2 Drawing Sheets

COMBINED GAS TURBINE AND STEAM TURBINE POWER PLANT

FIELD OF THE INVENTION

The present invention relates to a power plant comprising a gas turbine module and a steam turbine having a high pressure portion and a low pressure portion mounted on the same shaft line that drives an alternator disposed at the end of the shaft line, the gas turbine module including a stator provided with an air inlet and with an exhaust provided with a flexible gasket at its outlet, said stator being supported by a base secured to a foundation by means of supports having low stiffness in translation, and also being secured to the stationary portion of an abutment of the shaft line, the high pressure portion of the steam turbine including a stator fixed to the foundation, and its low pressure portion including a stator fixed to the foundation via a fixing point that is situated at its end that is remote from the alternator.

BACKGROUND OF THE INVENTION

In the known power plant, the stationary portion of the gas turbine abutment is mounted on the foundation and constitutes the stationary point of the shaft line.

The amount of expansion to which said shaft line is subject is large and that gives rise to a loss of efficiency.

OBJECT AND SUMMARY OF THE INVENTION

The power plant of the invention enables expansion along a single shaft line to be reduced. According to the invention the stator of the high pressure portion is fixed to the foundation via a fixing point situated at its end that is remote from the gas turbine module, and wherein the shaft line is provided with an abutment whose stationary portion is mounted on the foundation and is disposed between the said two fixing points for the starors of the high pressure portion and of the low pressure portion.

The stationary point of the shaft line is now said abutment. As a result, expansion of the shaft line towards the end carrying the alternator is reduced. Expansion in the opposite direction is taken up by the supports having low stiffness and by the flexible gasket.

Instead of a high pressure portion, the steam turbine may include a combined high and medium pressure portions within the same stator.

The present invention thus makes it possible to improve the efficiency of the turbines while retaining the advantage of a single shaft line, the possibility of retaining a single alternator module for various different dispositions of the gas turbine and steam turbine modules selected as a function of cycles that correspond to desired power output, but while maintaining axial clearances that are identical to those that would have been provided had the rotary machines been separate from each other, each having its own shaft abutment.

The gas turbine supports having low stiffness in translation are preferably provided with shock absorbers for longitudinal displacements.

BRIEF DESCRIPTION OF THE DRAWINGS

An embodiment of the invention is described below with reference to the diagrammatic figures of the accompanying drawings, which show a combined gas turbine and steam turbine power plant ("combined cycle plant", for short) both of the prior art and of the invention.

MORE DETAILED DESCRIPTION

Figure 1:
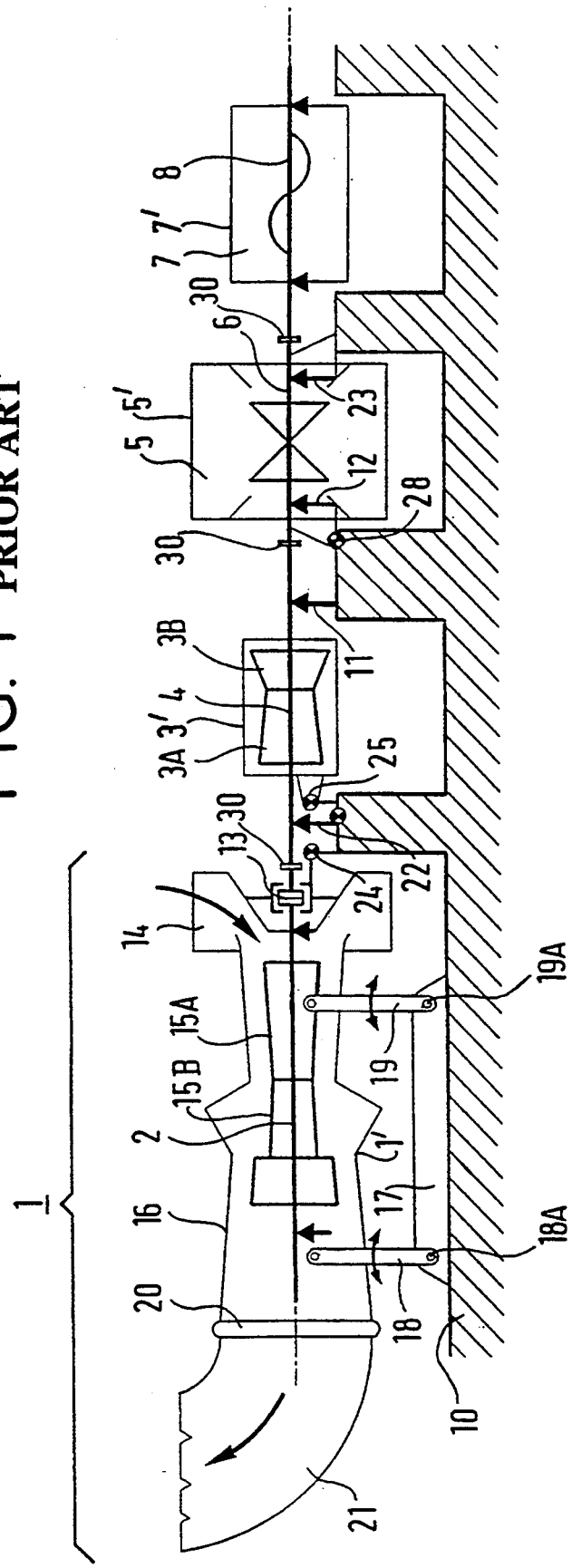
FIG. 1 is an overall view of the prior art power plant.

The power plant of FIG. 1 comprises a gas turbine module 1 having a stator 1' and a shaft 2, and a steam turbine module comprising a high and medium pressure portion 3A, 3B of stator 3' and shaft 4, together with a low pressure portion 5 of stator 5' and shaft 6. The alternator 7 of stator 7' and shaft 8 is located at the opposite end to the gas turbine.

In a variant (not shown) the stator 3' and the shaft 4 constitute a high pressure portion 3A only, and the medium pressure portion 3B does not exist.

The shafts 2, 4, 6 and 8 are coupled together by coupling devices 30.

The gas turbine module includes an air inlet 14, a compressor 15A, the turbine proper 15B, and an exhaust chamber 16. The stator 1' of the module 1 bears against a base 17 on the foundation 10 via supports 18 and 19 having low longitudinal stiffness and supported about axes 18A and 19A that are secured to the base 17. A flexible gasket 20 connects the exhaust end of the gas turbine to a duct 21 for evacuating combustion gases. The thrust of the exhaust gas is transmitted by the shaft 2 to the abutment 13 of the gas turbine module.

The shaft line is supported by stationary supports 22 situated between the gas turbine abutment 13 and the high pressure portion of the steam turbine, on stationary supports 11 and 12 situated between the medium pressure portion and the low pressure portion, and on stationary supports 23 situated between the low pressure portion and the alternator.

The fixed portion of the abutment 13 of the gas turbine module is integrated in the air inlet structure 14 and is secured to the foundation 10 at a point 24.

The stator 3' of the HP-MP portion is secured at its front end (gas turbine end) to the foundation 10 at a point 25.

The stator 5' of the LP portion 5 is secured at its front end to the foundation 10 via a fixing point 28.

The stator 7' of the alternator 7 is secured at a plurality of points (not shown) to the foundation 10.

The stationary point of the shaft line is thus the abutment 13. When expansion takes place, it becomes very great along the shaft line, in particular in the LP portion 5 and in the alternator 7.

Figure 2:
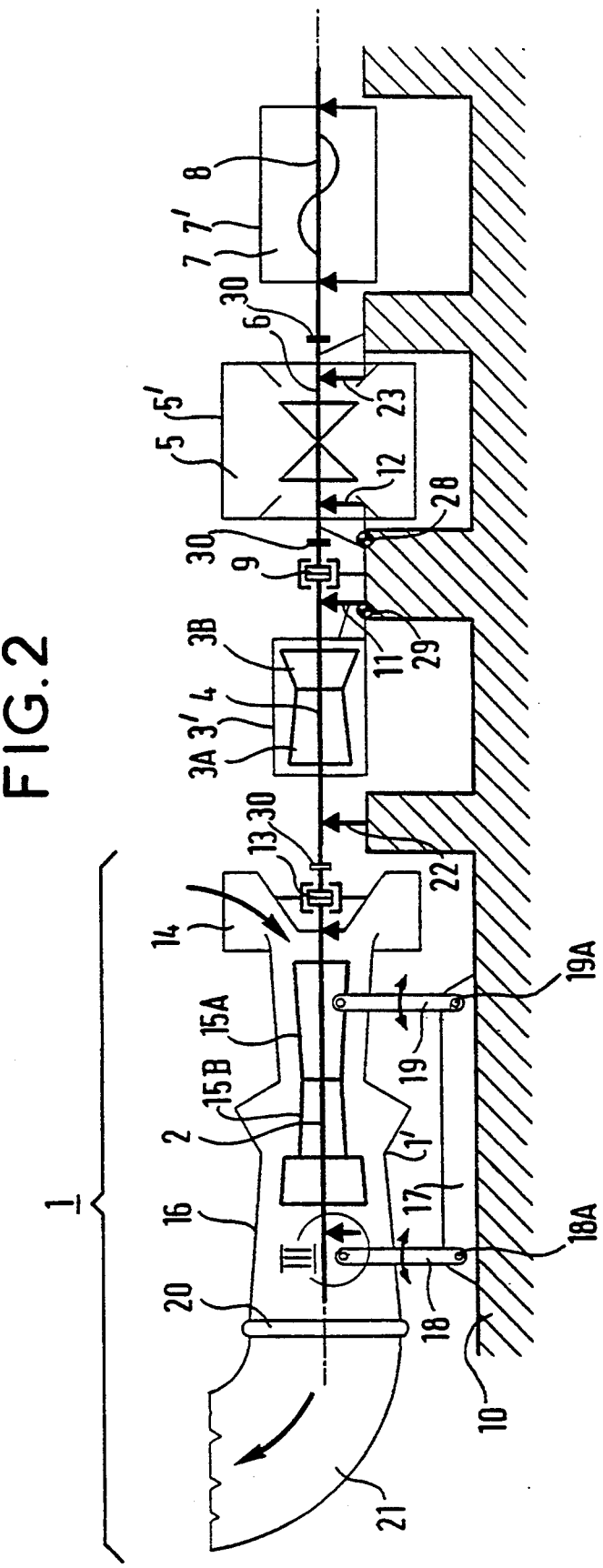
FIG. 2 is an overall view of a power plant of the invention.

FIG. 2 shows a power plant of the invention and the same reference numbers are used for designating portions that are similar to those shown in FIG. 1.

As can be seen in FIG. 2, the stationary portion of the abutment 13 of the gas turbine module is no longer secured to the foundation. Similarly, the stator 3' of the HP-MP portion is no longer secured at its front end to the foundation.

An abutment 9 has been disposed on the shaft line between the HP-MP portion 3A-3B and the LP portion 5.

In addition, the rear end of the stator 3' is fixed to the foundation 10 via a fixing point 29. The fixing points 29 and 28 are situated on either side of the abutment 9. The stationary point of the shaft line is now constituted by the abutment 9. The shaft line expands in both directions away from said abutment 9. Thus, forward expansion of the shaft line will have an effect on the stator 1' via the abutment 13, which stator will then move to the left (in the figure), making use of the play available from the supports 18 and 19 and from the gasket 20.

To the rear, there will also be expansions of the shaft line, but they will be very considerably smaller than those that occur in the power plant of FIG. 1 since the length of the shaft line running from the abutment 9 is considerably shorter than the length of the shaft line running from the abutment 13.

Figure 3:
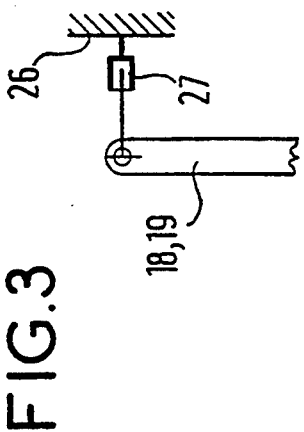
FIG. 3 is a view on a larger scale of detail III of FIG. 2 (shock absorber for a gas turbine abutment).

As shown in FIG. 3, the flexible supports such as 18 or 19 for the gas turbine module are connected to stationary walls such as 26 by means of shock absorbers 27 that prevent said module from being subjected to horizontal oscillations, and thus prevent the thrust on the abutment 9 of the steam turbine from fluctuating.

I claim:

1. A power plant comprising a gas turbine module and a steam turbine having a high pressure portion and a low pressure portion mounted on the same shaft line that drives an alternator disposed at the end of the shaft line, the gas turbine module including a stator provided with an air inlet and with an exhaust provided with a flexible gasket at its outlet, said stator being supported by a base secured to a foundation by means of supports pivotally secured to said stator and to said base, and also being secured to the stationary portion of a first shaft coupling of the shaft line, the high pressure portion of the steam turbine including a stator fixed to the foundation, and its low pressure portion including a stator fixed to the foundation via a fixing point that is situated at its end that is remote from the alternator, wherein the stator of the high pressure portion is fixed to the foundation via a fixing point situated at its end that is remote from the gas turbine module, and wherein the shaft line is provided with a second shaft coupling whose stationary portion is mounted on the foundation and is disposed between the said two fixing points.

2. A power plant comprising a gas turbine module and a steam turbine having a high and medium pressure portion and a low pressure portion mounted on the same shaft line that drives an alternator disposed at the end of the shaft line, the gas turbine module including a stator provided with an air inlet and with an exhaust provided with a flexible gasket at its outlet, said stator being supported by a base secured to a foundation by means of supports pivotally secured to said stator and to said base, and also being secured to the stationary portion of a first shaft coupling of the shaft line, the high and medium pressure portion of the steam turbine including a stator fixed to the foundation, and its low pressure portion including a stator fixed to the foundation via a fixing point that is situated at its end that is remote from the alternator, wherein the stator of the high and medium pressure portion is fixed to the foundation via a fixing point situated at its end that is remote from the gas turbine module, and wherein the shaft line is provided with a second shaft coupling whose stationary portion is mounted on the foundation and is disposed between the said two fixing points.

3. A power plant as recited in claim 1, wherein said supports are pivotally secured to said stator and to said base so as to be free to rotate about axes of rotation substantially perpendicular to the shaft line.

4. A power plant as recited in claim 2, wherein said supports are pivotally secured to said stator and to said base so as to be free to rotate about axes of rotation substantially perpendicular to the shaft line.

* * * * *